(12) United States Patent
Dudar (10) Patent No.: US 11,668,267 B2
(45) Date of Patent: Jun. 6, 2023

(54) METHOD AND SYSTEM FOR DIAGNOSING A HEATER OF A CARBON FILLED CANISTER

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/444,698

(22) Filed: Aug. 9, 2021

(65) Prior Publication Data

US 2023/0037316 A1   Feb. 9, 2023

(51) Int. Cl.
*F02M 25/08* (2006.01)
*F02D 41/00* (2006.01)

(52) U.S. Cl.
CPC ....... *F02M 25/0809* (2013.01); *F02D 41/004* (2013.01); *F02M 25/089* (2013.01); *F02M 25/0836* (2013.01); *F02M 2025/0881* (2013.01)

(58) Field of Classification Search
CPC .......... F02M 25/0809; F02M 25/0836; F02M 25/089; F02M 2025/0881; F02D 41/004
See application file for complete search history.

(56) References Cited

U.S. PATENT DOCUMENTS

| | | | |
|---|---|---|---|
| 7,810,475 B2 | 10/2010 | Peters et al. | |
| 8,312,765 B2 | 11/2012 | Pursifull et al. | |
| 9,512,791 B1 | 12/2016 | Dudar et al. | |
| 9,790,874 B2 * | 10/2017 | Dudar | F02D 41/009 |
| 10,054,070 B2 * | 8/2018 | Dudar | F02D 41/0037 |
| 2004/0000352 A1 * | 1/2004 | Kojima | B01D 53/229 |
| | | | 123/518 |
| 2016/0138528 A1 * | 5/2016 | Burleigh | B60L 7/26 |
| | | | 123/520 |
| 2017/0114732 A1 * | 4/2017 | Dudar | F02M 25/0854 |

* cited by examiner

*Primary Examiner* — Hung Q Nguyen
*Assistant Examiner* — Susan E Scharpf
(74) *Attorney, Agent, or Firm* — Vincent Mastrogiacomo; McCoy Russell LLP (57) ABSTRACT

Methods and systems for diagnosing operational status of a carbon filled canister heater are described. The methods and systems may include activating an evaporative emissions system heater, a pump, and a canister purge valve to determine if long chain hydrocarbons are released from a carbon filled canister. Release of long chain hydrocarbons from the carbon filled canister may be indicative of desired operation of a carbon filled canister heater.

20 Claims, 6 Drawing Sheets

METHOD AND SYSTEM FOR DIAGNOSING A HEATER OF A CARBON FILLED CANISTER

FIELD

The present description relates generally to methods and systems for diagnosing a heater of a carbon filled canister.

BACKGROUND/SUMMARY

A vehicle emissions system may include a carbon filled canister for storing fuel vapors. The carbon filled canister may be filled with fuel vapors when a fuel tank is being filled. The fuel vapors that are stored in the carbon filled canister may be released into an intake manifold of a running engine so that the carbon filled canister has capacity to store fuel vapors the next time the fuel tank is filled. However, it may be difficult to purge all hydrocarbons from the carbon filled canister because the carbon filled canister may store both short and long chain hydrocarbons. The short chain hydrocarbons may be released from the carbon in the carbon filled canister by simply passing air through the carbon filled canister. On the other hand, long chain hydrocarbons may tend to remain in the carbon filled canister. These long chain hydrocarbons may eventually migrate from the carbon filled canister and reach the atmosphere when a vehicle is parked and exposed to diurnal heating and cooling. As such, the vehicle's evaporative emissions may be greater than may be desired. One way to assist the removal of long and short chain hydrocarbons from the carbon filled canister may be to heat the carbon filled canister and pass air through the heated carbon canister. The carbon canister heater may be considered an emissions component, and as such, it may require a diagnostic to determine whether or not it is working as desired. Diagnosing operation of the heater may require additional hardware and electrical connections to the hydrocarbon canister, which may increase system cost and increase the possibility of releasing hydrocarbons through the electrical connections. Therefore, it may be desirable to provide a way of diagnosing a carbon filled canister heating device without additional sensors and additional electrical connections into the carbon filled canister.

The inventor herein has recognized the above-mentioned issue and has developed a method for operating a vehicle, comprising: activating a carbon filled canister heater, a canister purge valve, and an evaporative emissions system pump via a controller while an engine of the vehicle is off.

By activating a carbon filled canister heater, a canister purge valve, and an evaporative emissions system pump, it may be possible to provide the technical result of diagnosing the carbon filled canister heater without additional sensors or sensing a temperature in the carbon filled canister, which may increase chances of releasing hydrocarbons to atmosphere. In particular, an intake air temperature sensor that is positioned in an air intake near a hydrocarbon trap, may sense heat generated by storing long chain hydrocarbons that may be released from the carbon filled canister in a hydrocarbon trap. The intake air temperature sensor may also sense an increase in temperature that may be related to heating air that flows through the carbon filled canister by motive force that is supplied via the pump.

The present description may provide several advantages. In particular, the approach may reduce system cost by utilizing existing sensors. Additionally, the approach may reduce a possibility of hydrocarbons escaping from an evaporative emissions system. Further, the approach may be implemented in a way that is not apparent to a vehicle's operator.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for diagnosing operation of a carbon filled canister heater. The heater may help to release long chain hydrocarbons that may be stored in a carbon filled canister of an evaporative emissions system. The evaporative emissions system may be coupled to an engine of the type shown in FIG. 1. One example of the evaporative emissions system is shown in FIG. 2. The evaporative emissions system may be operated according to the sequences of FIGS. 3 and 4. A vehicle and its evaporative emissions system may be operated according to the methods of FIGS. 5 and 6.

Figure 1:
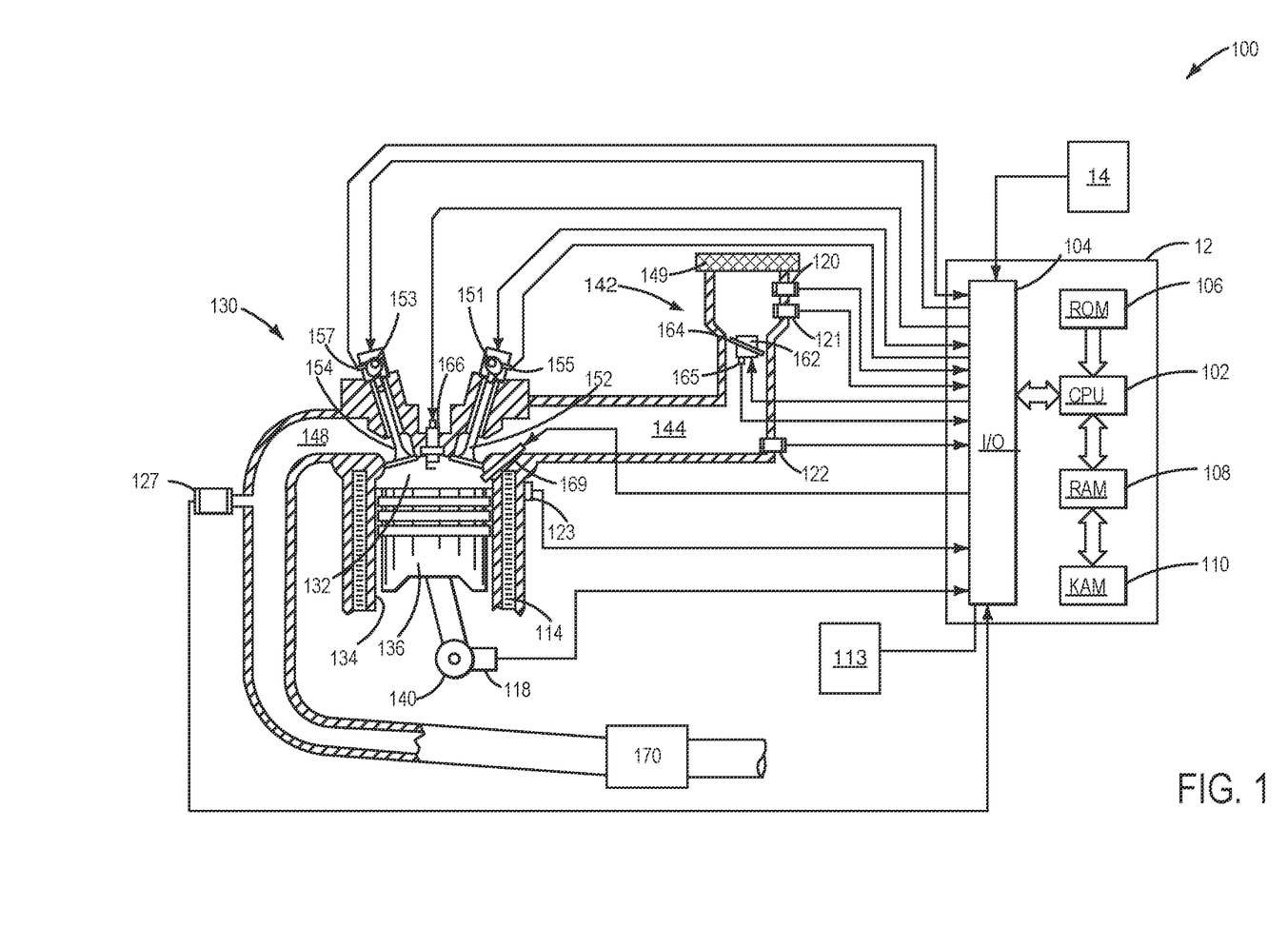
FIG. 1 shows an example internal combustion engine of a vehicle.
Figure 2:
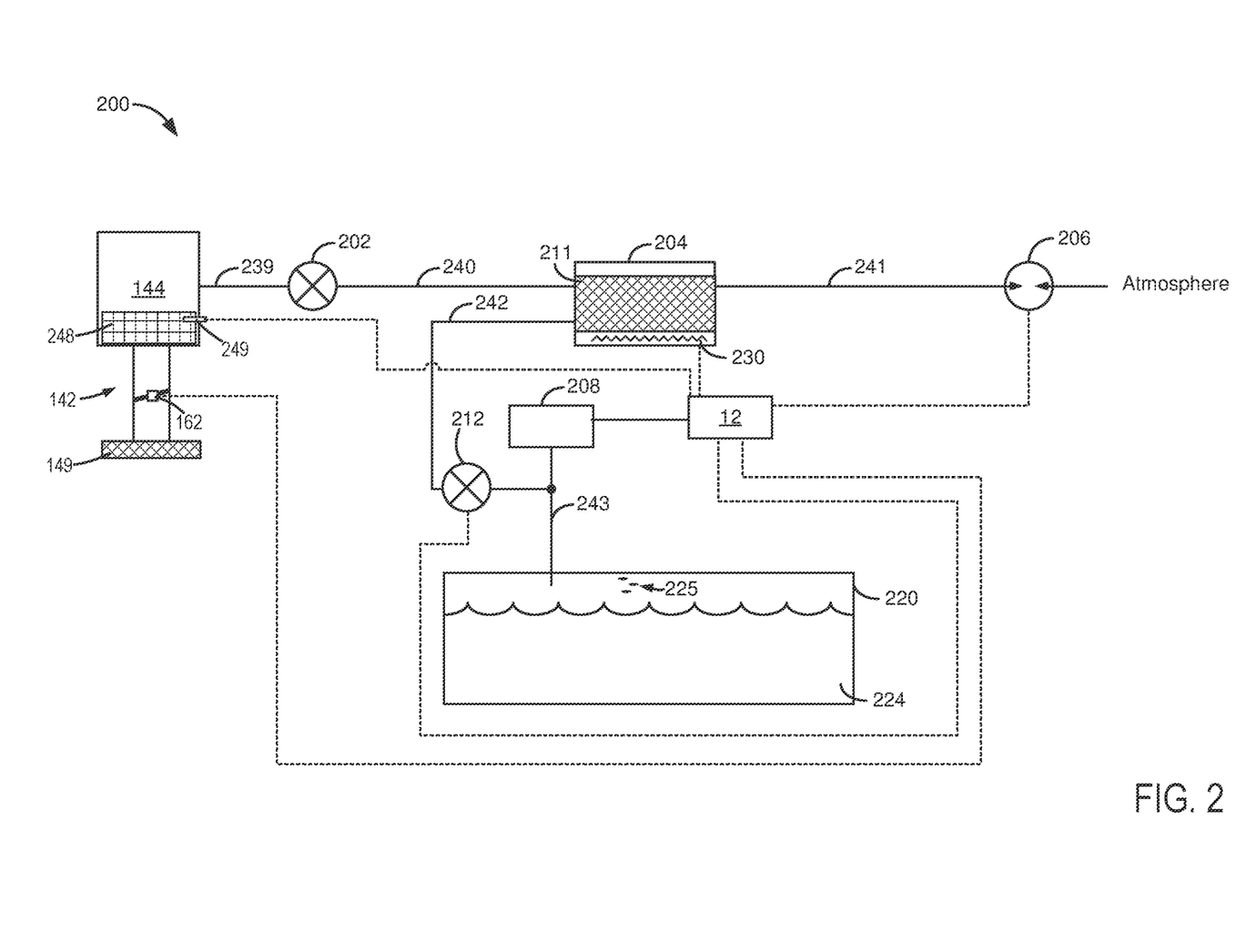
FIG. 2 shows a block diagram of an example evaporative emissions system for the vehicle.

Referring now to FIG. 1, a schematic diagram showing one cylinder of a multi-cylinder engine 130 in an engine system 100 is shown. Engine 130 may be controlled at least partially by a control system including a controller 12 and by input from an autonomous driver or controller 14. Alternatively, a vehicle operator (not shown) may provide input via an input device, such as an engine torque, power, or air amount input pedal (not shown).

A combustion chamber 132 of the engine 130 may include a cylinder formed by cylinder walls 134 with a piston 136 positioned therein. The piston 136 may be coupled to a crankshaft 140 so that reciprocating motion of the piston is translated into rotational motion of the crankshaft. The crankshaft 140 may be coupled to at least one drive wheel of a vehicle via an intermediate transmission system. Further, a starter motor (not shown) may be coupled to the crankshaft 140 via a flywheel to enable a starting operation of the engine 130.

Combustion chamber 132 may receive intake air from an intake manifold 144, which may be part of an engine air intake 142. Combustion chamber 132 may deliver exhaust combustion gases to an exhaust passage 148. The intake passage 142 includes an intake air filter 148. The intake manifold 144 and the exhaust passage 148 can selectively communicate with the combustion chamber 132 via respective intake valve 152 and exhaust valve 154. In some examples, the combustion chamber 132 may include two or more intake valves and/or two or more exhaust valves.

In this example, the intake valve 152 and exhaust valve 154 may be controlled by cam actuation via respective cam actuation systems 151 and 153. The cam actuation systems 151 and 153 may each include one or more cams and may utilize one or more of cam profile switching (CPS), variable cam timing (VCT), variable valve timing (VVT), and/or variable valve lift (VVL) systems that may be operated by the controller 12 to activate, deactivate (e.g., hold in a closed position for an engine cycle of two revolutions), and vary timing of valve operation. The position of the intake valve 152 and exhaust valve 154 may be determined by position sensors 155 and 157, respectively. In alternative examples, the intake valve 152 and/or exhaust valve 154 may be controlled by electric valve actuation. For example, the cylinder 132 may alternatively include an intake valve controlled via electric valve actuation and an exhaust valve controlled via cam actuation including CPS and/or VCT systems.

A fuel injector 169 is shown coupled directly to combustion chamber 132 for injecting fuel directly therein in proportion to the pulse width of a signal received from the controller 12. In this manner, the fuel injector 169 provides what is known as direct injection of fuel into the combustion chamber 132. The fuel injector may be mounted in the side of the combustion chamber or in the top of the combustion chamber, for example. Fuel may be delivered to the fuel injector 169 by a fuel system (not shown) including a fuel tank, a fuel pump, and a fuel rail. In some examples, the combustion chamber 132 may alternatively or additionally include a fuel injector arranged in the intake manifold 144 in a configuration that provides what is known as port injection of fuel into the intake port upstream of the combustion chamber 132.

Spark is provided to combustion chamber 132 via spark plug 166. The ignition system may further comprise an ignition coil (not shown) for increasing voltage supplied to spark plug 166. In other examples, such as a diesel, spark plug 166 may be omitted.

The intake passage 142 may include an intake throttle 162 having a throttle plate 164. In this particular example, the position of throttle plate 164 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 132 among other engine cylinders. The position of the throttle plate 164 may be provided to the controller 12 by a throttle position signal. The intake passage 142 may include a mass air flow sensor 120, an intake inlet pressure sensor 121, and a manifold air pressure sensor 122 for sensing an amount of air entering engine 130.

An exhaust gas sensor 127 is shown coupled to the exhaust passage 148 upstream of an emission control device 170 according to a direction of exhaust flow. The sensor 127 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 127 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 170 is shown arranged along the exhaust passage 148 downstream of the exhaust gas sensor 127. The device 170 may be a three way catalyst (TWC), $NO_x$ trap, various other emission control devices, or combinations thereof. In some examples, during operation of the engine 130, the emission control device 170 may be periodically reset by operating at least one cylinder of the engine within a particular air-fuel ratio.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 130, in addition to those signals previously discussed, including measurement of inducted mass air flow (MAF) from the mass air flow sensor 120; engine coolant temperature (ECT) from a temperature sensor 123 coupled to a cooling sleeve 114; an engine position signal from a Hall effect sensor 118 (or other type) sensing a position of crankshaft 140; throttle position from a throttle position sensor 165; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 144. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 (e.g., non-transitory memory) can be programmed with computer readable data representing non-transitory instructions executable by the processor 102 for performing at least portions of the methods described below as well as other variants that are anticipated but not specifically listed. Thus, controller 12 may operate actuators to change operation of engine 130. In addition, controller 12 may post data, messages, and status information to human/machine interface 113 (e.g., a touch screen display, heads-up display, light, etc.).

During operation, each cylinder within engine 130 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 132 via intake manifold 144, and piston 136 moves to the bottom of the cylinder so as to increase the volume within combustion chamber 132. The position at which piston 136 is near the bottom of the cylinder and at the end of its stroke (e.g. when combustion chamber 132 is at its largest volume) is typically referred to by those of skill in the art as bottom dead center (BDC).

During the compression stroke, intake valve 152 and exhaust valve 154 are closed. Piston 136 moves toward the cylinder head so as to compress the air within combustion chamber 132. The point at which piston 136 is at the end of its stroke and closest to the cylinder head (e.g. when combustion chamber 132 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 166, resulting in combustion.

During the expansion stroke, the expanding gases push piston 136 back to BDC. Crankshaft 140 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine, and each cylinder may similarly include its own set of intake/exhaust valves, fuel injector, spark plug, etc.

Referring now to FIG. 2, a block diagram of an example evaporative emissions system 200 is shown. Evaporative emissions system 200 includes a canister purge valve 202, a carbon filled canister 204, a bi-directional evaporative emissions system pump 206, a fuel tank pressure sensor 208, a fuel tank vent valve 212, and a fuel tank 220. Carbon filled canister 204 may include activated carbon 211 to store fuel vapors and a heater 230 to facilitate release of stored hydrocarbons.

Canister purge valve 202 may open and close to selectively provide fluidic communication between carbon canister 204 and intake manifold 144. Intake manifold 144 may include a hydrocarbon trap 248 and an intake air temperature sensor 249. Bi-directional pump 206 may pump air from atmosphere to intake air filter 149 when throttle 162 and canister purge valve 202 are open. Air flow to intake air filter 149 and throttle 162 from bi-directional pump 206 may be improved by fully closing fuel tank vent valve 212. Heater 230 may increase a temperature of air that flows to intake air filter 148 and throttle 162. Bi-directional pump 206 may also pull fuel vapors 225 from fuel 224 in fuel tank 220 through carbon canister 204 where hydrocarbons are stored. The remaining air may be purged to atmosphere.

Conduit 239 provides fluid communication between intake manifold 144 and canister purge valve 202. Conduit 240 provides fluid communication between canister purge valve 202 and carbon canister 204. Conduit 241 provides fluid communication between carbon filled canister 204 and bi-directional pump 206. Conduit 242 provides fluid communication between carbon filled canister 230 and fuel tank vent valve 212. Conduit 243 provides fluid communication between fuel tank vent valve 212 and fuel tank 220.

Figure 3:
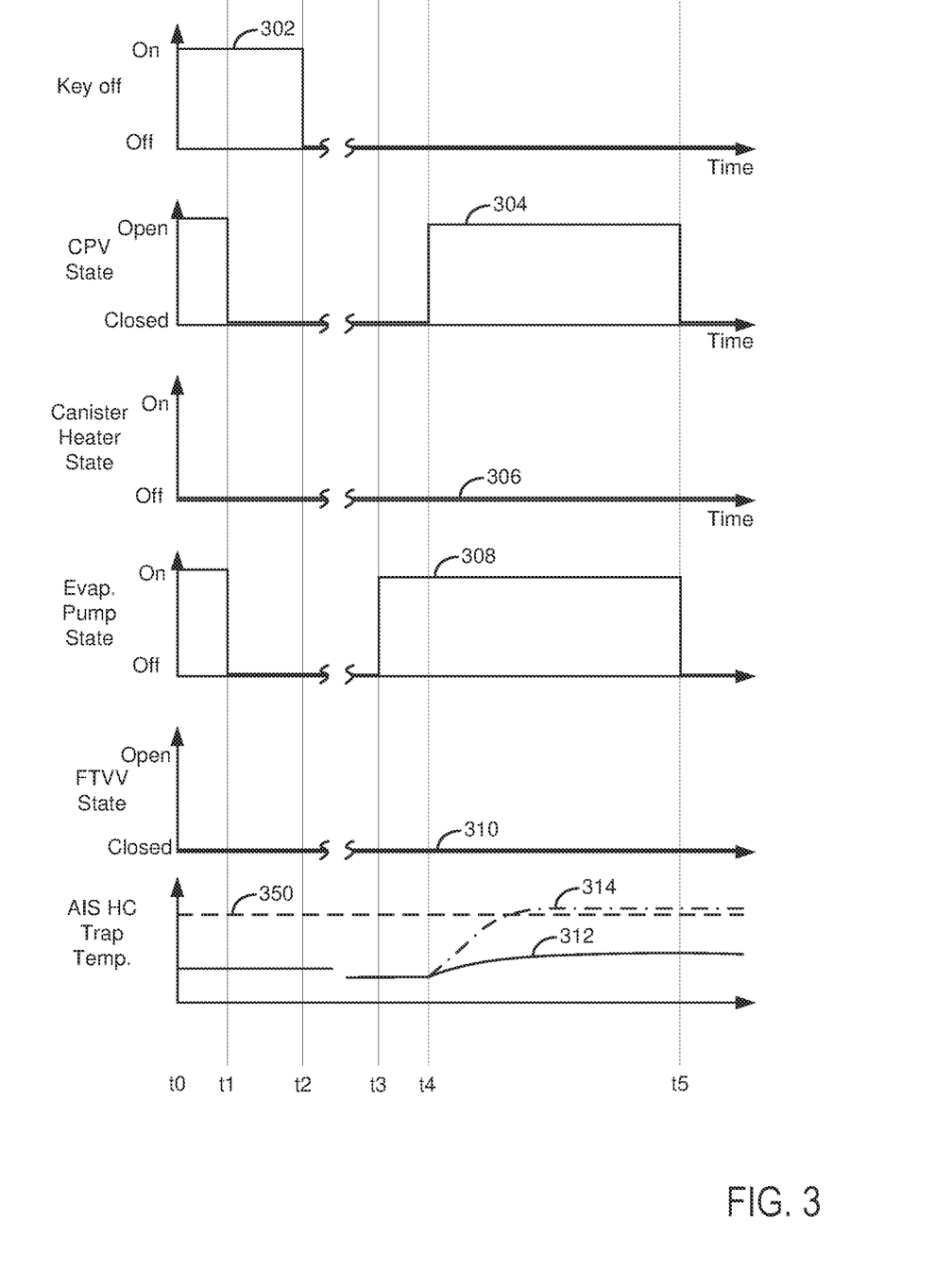
FIG. 3 shows a first portion of an example evaporative emission system operating sequence according to the method of FIG. 5

Thus, the system of FIGS. 1-3 provides for a vehicle system, comprising: an engine including an air intake system, the air intake system including an intake air temperature sensor and a hydrocarbon trap; an evaporative emissions system coupled to the engine including a carbon filled canister, a heater in the carbon filled canister, a pump, and a canister purge valve; and a controller including executable instructions stored in non-transitory memory that cause the controller to activate the heater, activate the pump, and monitor the temperature sensor while the engine is off. The vehicle system further comprises additional instructions to indicate degradation of the heater in response to a temperature change indication generated by the temperature sensor being less than a threshold. The vehicle system further comprises additional instructions to perform mitigating actions in response to a temperature change indication generated by the temperature sensor being less than a threshold. The vehicle system includes where the mitigating actions include increasing a frequency of purging the carbon filled canister. The vehicle system includes where the mitigating actions include increasing a duration of purging the carbon filled canister. The vehicle system further comprises additional executable instructions to open the canister purge valve while the engine is off. The vehicle system further comprises additional executable instructions to deactivate the heater after a predetermined amount of time.

Referring now to FIG. 3, a first portion of an example sequence for diagnosing operation of a carbon filled canister heater is shown. The sequence of FIG. 3 may be provided by the system of FIGS. 1 and 2 in cooperation with the methods of FIGS. 5 and 6. Vertical markers at times t0-t5 represent times of interest during the sequence. All of the plots occur at a same time. The double SS marks along the horizontal axes represent a break in time in the sequence that may be long or short in duration.

The first plot from the top of FIG. 3 is a plot of a key state versus time. The key state may represent the operational status of a vehicle where "On" or activated state indicates that the vehicle's engine is rotating and combusting fuel. An "Off" or deactivated state indicates that the vehicle's engine is not rotating and combusting fuel. The vertical axis represents the key state and the key state is "On" when trace 302 is at the level along the vertical axis indicated as "On." The key state is "Off" when trace 302 is at the level along the vertical axis indicated as "Off." The horizontal axis represents time and time increases from the left side of the figure to the right side of the figure. Trace 302 represents the key state.

The second plot from the top of FIG. 3 is a plot of canister purge valve (CPV) state versus time. The vertical axis represents the CPV state and the CPV is open when trace 304 is at a higher level near the vertical axis arrow. The CPV is fully closed when trace 304 is at a lower level near the horizontal axis. The horizontal axis represents time and time increases from the left side of the figure to the right side of the figure. Trace 304 represents the state of the CPV.

The third plot from the top of FIG. 3 is a plot of a carbon canister heater state versus time. The vertical axis represents the carbon canister heater state and the carbon canister heater is on when trace 306 is at a higher level near the vertical axis arrow. The carbon canister heater is off when trace 306 is at a lower level near the horizontal axis. The horizontal axis represents time and time increases from the left side of the figure to the right side of the figure. Trace 306 represents the state of the carbon canister heater.

The fourth plot from the top of FIG. 3 is a plot of an evaporative emissions system pump (e.g., 206) state versus time. The vertical axis represents the evaporative emissions system pump state and the evaporative emissions system pump is on when trace 308 is at a higher level near the vertical axis arrow. The evaporative emissions system pump is off when trace 308 is at a lower level near the horizontal axis. The horizontal axis represents time and time increases from the left side of the figure to the right side of the figure. Trace 308 represents the state of the evaporative emissions system pump.

The fifth plot from the top of FIG. 3 is a plot of fuel tank vent valve (FTVV) state versus time. The vertical axis represents the FTVV state and the FTVV is open when trace 310 is at a higher level near the vertical axis arrow. The FTVV is fully closed when trace 310 is at a lower level near the horizontal axis. The horizontal axis represents time and time increases from the left side of the figure to the right side of the figure. Trace 310 represents the state of the FTVV.

The sixth plot from the top of FIG. 3 is a plot of air intake system hydrocarbon trap temperature versus time. The vertical axis represents the hydrocarbon trap temperature and the hydrocarbon trap temperature increases in the direction of the vertical axis arrow. Trace 312 represents a temperature of the hydrocarbon trap when the hydrocarbon trap is storing small amounts of hydrocarbons that were released from the carbon filled canister. A "clean" carbon filled canister may increase a temperature of the hydrocarbon trap as indicated by trace 312. Trace 314 represents a temperature of the hydrocarbon trap when the hydrocarbon trap is storing large amounts of hydrocarbons that were released from the carbon filled canister. A "filled" carbon filled canister may increase a temperature of the hydrocarbon trap as indicated by trace 314. The trace 314 is at a same level as trace 312 when trace 314 is not visible. Trace 350 represents a threshold temperature increase that may indicate that the carbon filled canister is not in a "clean" state. The horizontal axis represents time and time increases from the left side of the figure to the right side of the figure.

At time t0, the engine (not shown) is running (e.g., rotating and combusting fuel) and the canister purge valve (CPV) is open. The carbon filled canister heater is off so that a baseline hydrocarbon trap temperature may be determined. The evaporative emissions system pump is activated and it is pushing air from the carbon filled canister and into the engine intake manifold. The fuel tank vent valve (FTVV) is closed and the hydrocarbon trap temperature is at a lower level. The carbon filled canister is being purged of fuel vapors during such conditions. In particular, air is passed through the carbon filled canister and into the engine intake manifold while the engine is running. The engine combusts the fuel vapors.

At time t1, the engine continues running and the canister purge valve is closed. The carbon filled canister heater is off and the evaporative emissions system pump is also deactivated. The fuel tank vent valve remains closed and the hydrocarbon trap temperature is at a lower level. The carbon filled canister ceases being purged of fuel vapors during such conditions.

At time t2, the engine is stopped (e.g., not rotating and not combusting fuel) and the canister purge valve remains closed. The carbon filled canister heater remains off and the evaporative emissions system pump remains off. The fuel tank vent valve is closed and the hydrocarbon trap temperature is unchanged. The vehicle and engine cool down between time t2 and time t3.

At time t3, the engine remains stopped and the canister purge valve remains closed. The carbon filled canister heater remains off and the evaporative emissions system pump is activated. The fuel tank vent valve is closed and the hydrocarbon trap temperature is at a lower level.

At time t4, the engine is stopped and the canister purge valve is opened to allow air to flow through the carbon filled canister and into the engine intake where hydrocarbons that may be liberated from the carbon filled canister may be stored in the hydrocarbon trap. The carbon filled canister heater remains off and the fuel tank vent valve remains closed. The hydrocarbon trap temperature is unchanged; however, the hydrocarbon trap temperature begins to increase shortly after time t4 for conditions when the carbon filled canister is clean (trace 312) and conditions when the carbon filled canister holds a large amount of hydrocarbons (trace 314). During conditions when the carbon filled canister is storing fewer hydrocarbons (e.g., "clean"), the hydrocarbon trap temperature increases a small amount, but it remains below threshold 350. The hydrocarbon trap temperature increases when hydrocarbons are stored on the hydrocarbon trap. During conditions when the carbon filled canister is storing a greater amount of hydrocarbons, the hydrocarbon trap temperature may exceed threshold 350 as indicated by trace 314. The diagnostic does not continue if threshold 350 is exceeded since the hydrocarbon trap may over fill and because a good heater may not be distinguished from a degraded heater.

At time t5, the first portion of the example sequence for diagnosing operation of a carbon filled canister heater ends. The key state remains off and the canister purge valve is closed. The carbon filled canister heater remains off and the evaporative emissions system pump is turned off. The fuel tank vent valve remains closed and the hydrocarbon temperatures cease increasing.

Thus, the first portion of the carbon filled canister heater diagnostic attempts to get a baseline hydrocarbon trap temperature so that a working carbon filled canister heater may be distinguished from a degraded carbon filled canister heater (e.g., a heater that does not provide heat as requested). If the change in hydrocarbon trap temperature exceeds a threshold, the diagnostic may be aborted since it may be difficult to determine a presence of a degraded heater during such conditions.

Figure 4:
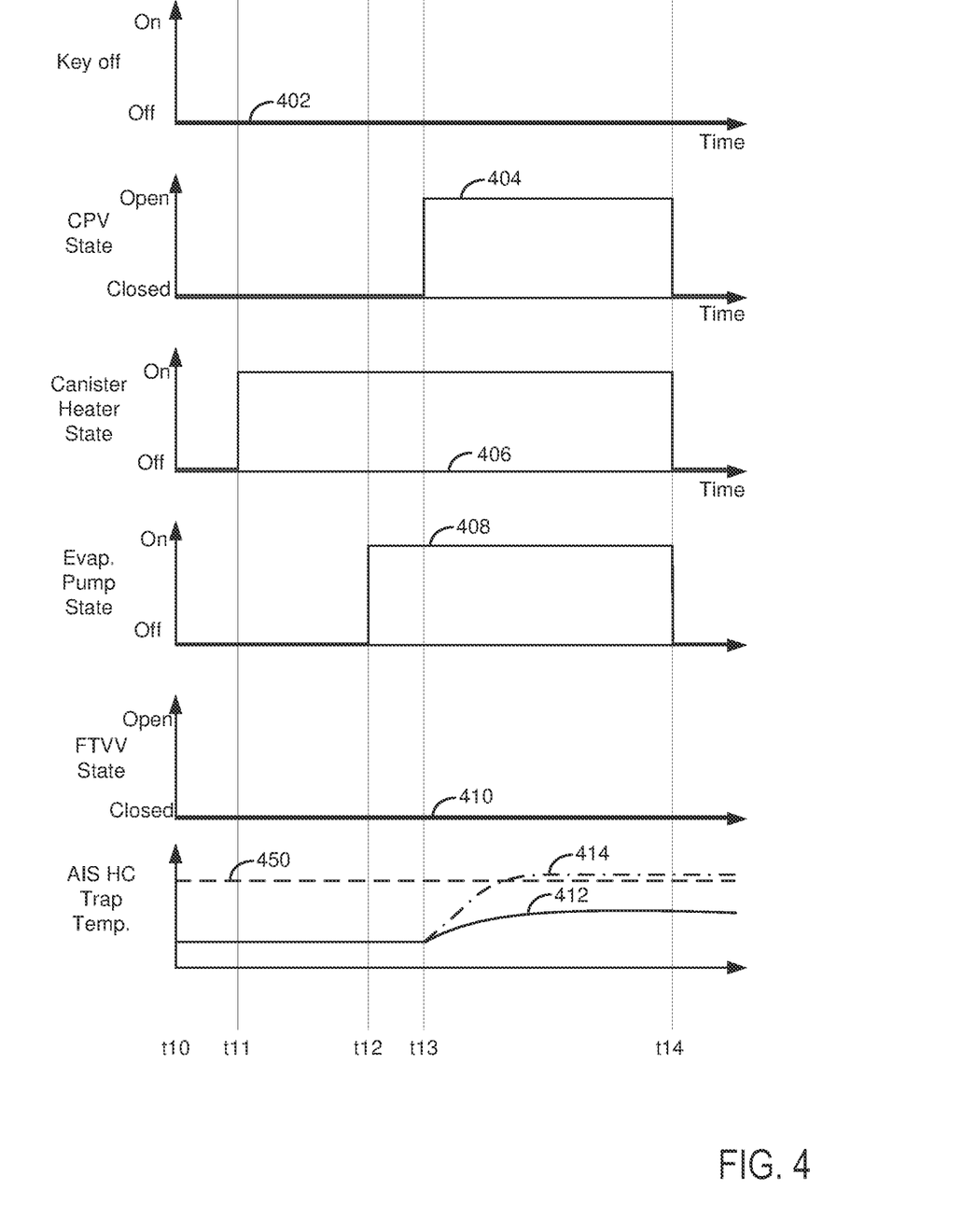
FIG. 4; shows a second portion of an example evaporative emission system operating sequence according to the method of FIG. 5.

Referring now to FIG. 4, a second portion of an example sequence for diagnosing operation of a carbon filled canister heater is shown. There may be a predetermined amount of time between the first and second portions of the sequence to allow the hydrocarbon trap to cool. The sequence of FIG. 4 may be provided by the system of FIGS. 1 and 2 in cooperation with the methods of FIGS. 5 and 6. Vertical markers at times t10-t4 represent times of interest during the sequence. All of the plots occur at a same time.

The first plot from the top of FIG. 4 is a plot of a key state versus time. The key state may represent the operational status of a vehicle where "On" or activated state indicates that the vehicle's engine is rotating and combusting fuel. An "Off" or deactivated state indicates that the vehicle's engine is not rotating and combusting fuel. The vertical axis represents the key state and the key state is "On" when trace 402 is at the level along the vertical axis indicated as "On." The key state is "Off" when trace 402 is at the level along the vertical axis indicated as "Off." The horizontal axis represents time and time increases from the left side of the figure to the right side of the figure. Trace 402 represents the key state.

The second plot from the top of FIG. 4 is a plot of canister purge valve (CPV) state versus time. The vertical axis represents the CPV state and the CPV is open when trace 404 is at a higher level near the vertical axis arrow. The CPV is fully closed when trace 404 is at a lower level near the horizontal axis. The horizontal axis represents time and time increases from the left side of the figure to the right side of the figure. Trace 404 represents the state of the CPV.

The third plot from the top of FIG. 4 is a plot of a carbon canister heater state versus time. The vertical axis represents the carbon canister heater state and the carbon canister heater is on when trace 406 is at a higher level near the vertical axis arrow. The carbon canister heater is off when trace 406 is at a lower level near the horizontal axis. The horizontal axis represents time and time increases from the left side of the figure to the right side of the figure. Trace 406 represents the state of the carbon canister heater.

The fourth plot from the top of FIG. 4 is a plot of an evaporative emissions system pump (e.g., 206) state versus time. The vertical axis represents the evaporative emissions system pump state and the evaporative emissions system pump is on when trace 408 is at a higher level near the vertical axis arrow. The evaporative emissions system pump is off when trace 408 is at a lower level near the horizontal axis. The horizontal axis represents time and time increases from the left side of the figure to the right side of the figure. Trace 408 represents the state of the evaporative emissions system pump.

The fifth plot from the top of FIG. 4 is a plot of fuel tank vent valve (FTVV) state versus time. The vertical axis represents the FTVV state and the FTVV is open when trace 410 is at a higher level near the vertical axis arrow. The FTVV is fully closed when trace 410 is at a lower level near the horizontal axis. The horizontal axis represents time and time increases from the left side of the figure to the right side of the figure. Trace 410 represents the state of the FTVV.

The sixth plot from the top of FIG. 4 is a plot of air intake system hydrocarbon trap temperature versus time. The vertical axis represents the hydrocarbon trap temperature and the hydrocarbon trap temperature increases in the direction of the vertical axis arrow. Trace 412 represents a temperature of the hydrocarbon trap when the hydrocarbon trap is storing small amounts of hydrocarbons that were released from the carbon filled canister. A "clean" carbon filled canister may increase a temperature of the hydrocarbon trap as indicated by trace 412. Trace 414 represents a temperature of the hydrocarbon trap when the hydrocarbon trap is storing large amounts of hydrocarbons that were released from the carbon filled canister. A "filled" carbon filled canister may increase a temperature of the hydrocarbon trap as indicated by trace 414. The trace 414 is at a same level as trace 412 when trace 414 is not visible. Trace 450 represents a threshold temperature increase that may indicate that the carbon filled canister is not in a "clean" state. The horizontal axis represents time and time increases from the left side of the figure to the right side of the figure.

At time t10, the engine is no running and the canister purge valve is closed. The carbon filled canister heater is off and the evaporative emissions system pump is deactivated. The fuel tank vent valve (FTVV) is closed and the hydrocarbon trap temperature is at a lower level.

At time t11, the engine remains off and the canister purge valve remains closed. The carbon filled canister heater is activated to begin heating the carbon filled canister. The evaporative emissions system pump is deactivated and the fuel tank vent valve remains closed. The hydrocarbon trap temperature is at a lower level.

At time t12, the engine remains stopped and the canister purge valve remains closed. The carbon filled canister heater remains on and the evaporative emissions system pump is activated. These actions allow pressure to build within the carbon filled canister and vapors to heat within the carbon filled canister. The fuel tank vent valve is closed and the hydrocarbon trap temperature is at a lower level.

At time t13, the engine remains stopped and the canister purge valve is opened to allow hydrocarbons, including long chain hydrocarbons, to flow through the carbon filled canister and into the engine intake where hydrocarbons that may be liberated from the carbon filled canister may be stored in the hydrocarbon trap. The carbon filled canister heater remains on and the fuel tank vent valve remains closed. The hydrocarbon trap temperature begins to increase shortly after time t13. During conditions when the carbon filled canister heater is activated and heating the carbon filled canister, the hydrocarbon trap temperature increases a larger amount so that it may exceed threshold 450. The hydrocarbon trap temperature increases a small amount during conditions when the carbon filled canister heater is degraded such that it may not exceed threshold 450. If the hydrocarbon trap temperature exceeds threshold 450, heater degradation may be determined to not be present. If the hydrocarbon temperature does not exceed threshold 450, degradation of the carbon filled canister heater may be indicated.

At time t14, the second portion of the example sequence for diagnosing operation of a carbon filled canister heater ends. The key state remains off and the canister purge valve is closed. The carbon filled canister heater remains is turned off and the evaporative emissions system pump is turned off. The fuel tank vent valve remains closed and the hydrocarbon temperatures cease increasing.

Thus, the second portion of the carbon filled canister heater diagnostic attempts to determine whether or not the carbon filled canister heater is degraded. The determination may be based on a temperature of a hydrocarbon trap that is located in an intake system rather than in the emissions system. Therefore, the possibility of a breach in the evaporative emissions system may be reduced.

Figure 5:
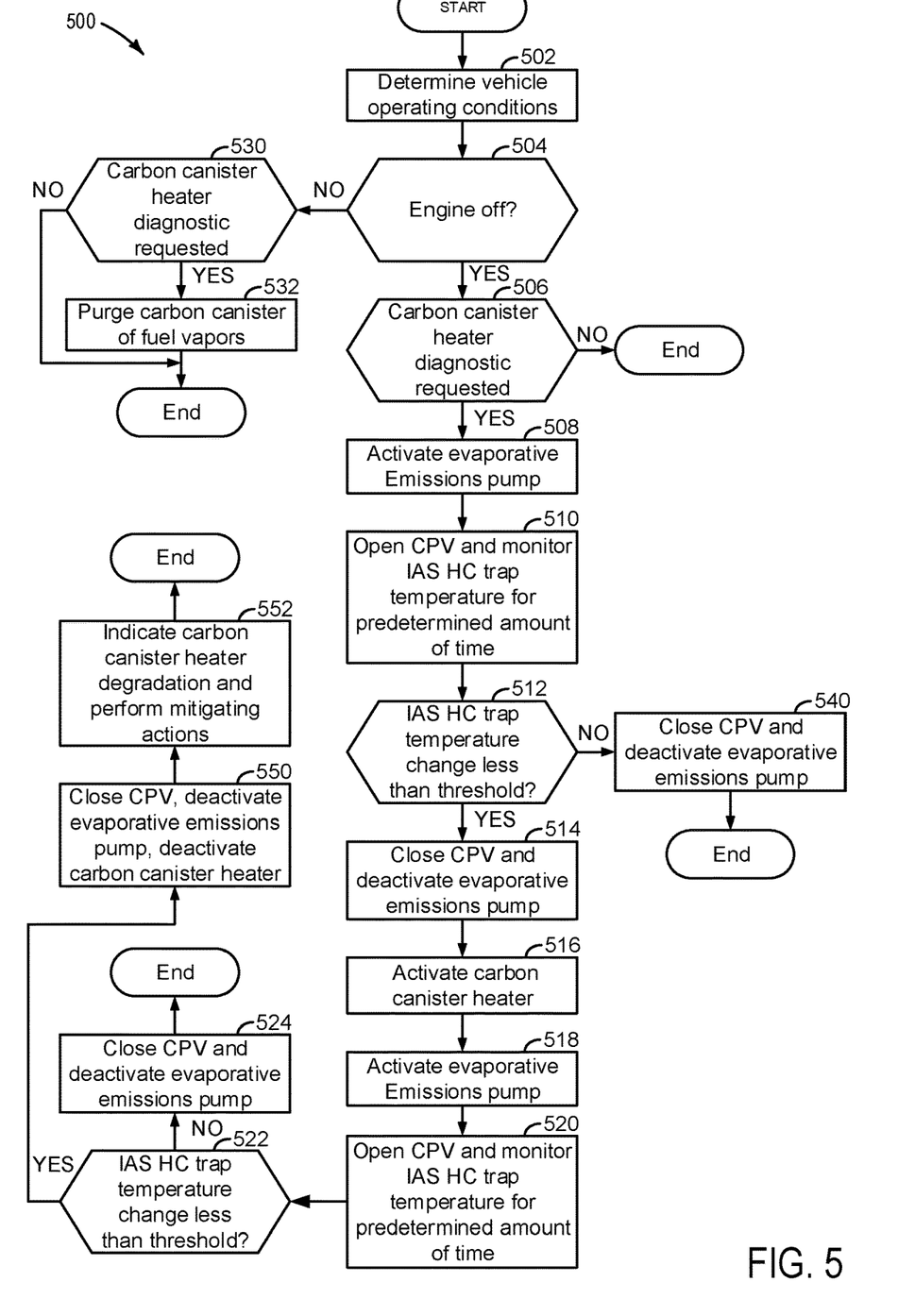
FIG. 5 shows an example method for operating a vehicle.

Referring now to FIG. 5, an example method 500 for operating a vehicle is shown. The method also includes determining if a carbon filled canister heater is degraded. At least portions of method 500 may be included in and cooperate with a system as shown in FIGS. 1 and 2 as executable instructions stored in non-transitory memory. The method of FIG. 5 may cause the controller to actuate the actuators in the real world and receive data and signals from sensors described herein when the method is realized via executable instructions stored in controller memory.

At 502, method 500 determines vehicle operating conditions. Vehicle operating conditions may include but are not limited to ambient air temperature, engine speed, engine air flow amount, driver demand torque or power, spark timing, barometric pressure, intake inlet pressure, and engine air-fuel ratio. Method 500 may determine or infer these conditions from the various sensors mentioned herein. Method 500 proceeds to 504.

At 504, method 500 judges if the engine is off (e.g., not rotating and not combusting air and fuel). Method 500 may judge that the engine is off if the engine is not rotating and if fuel is not presently being injected to the engine. If method 500 judges that the engine is off, the answer is yes and method 500 proceeds to 506. Otherwise, the answer is no and method 500 proceeds to 530.

At 530, method 500 judges if a carbon filled canister heater diagnostic is requested. A carbon filled heater diagnostic may be requested via a vehicle controller responsive to vehicle operating conditions. For example, a carbon filled heater diagnostic may be requested after a vehicle has operating a prescribed amount of time or after the vehicle has traveled a prescribed distance. If method 500 judges that a carbon filled canister heater diagnostic is requested, the answer is yes and method 500 proceeds to 532. Otherwise, the answer is no and method 500 proceeds to exit.

At 532, method 500 begins purging the carbon filled canister. In one example, method 500 may open the canister purge valve and activate an emission system pump to allow fuel vapors stored in the carbon filled canister to be drawn into the engine and combusted by the engine. Method 500 closes the canister purge valve and deactivates the emissions system pump when fuel vapors stored in the carbon filled canister are less than a threshold amount. Method 500 may close the canister purge valve responsive to output of one or more oxygen sensors. Method 500 proceeds to exit.

At 506, method 500 judges if a carbon filled canister heater diagnostic is requested. A carbon filled heater diagnostic may be requested via a vehicle controller responsive to vehicle operating conditions. If method 500 judges that a carbon filled canister heater diagnostic is requested, the answer is yes and method 500 proceeds to 508. Otherwise, the answer is no and method 500 proceeds to exit.

At 508, method 500 activates the evaporative emissions system pump. The pump is activated so that pressure may build within the carbon filled canister before vapors are released from the carbon filled canister. The pump may supply air to the carbon filled canister to purge fuel vapors from the carbon filled canister. Method 500 proceeds to 510.

At 510, method 500 opens the canister purge valve and begins monitoring a temperature of a hydrocarbon trap that is located in the engine's air intake system. Specifically, the temperature sensor may be located in the engine's intake manifold. Method 500 may open the canister purge valve and monitor the hydrocarbon trap temperature for a predetermined amount of time. Method 500 may also close or hold closed a fuel tank vent valve. Intake air temperature may be updated according to the method of FIG. 6. Additionally, method 500 may at least partially open the engine's throttle to increase flow through the engine. Method 500 proceeds to 512.

At 512, method 500 judges if a temperature change of the hydrocarbon trap is less than a threshold. If so, the answer is yes and method 500 proceeds to 514. Otherwise, the answer is no and method 500 proceeds to 540. Method 500 may wait a threshold amount of time between step 510 and step 512. An answer of yes may indicate that the bulk of small chain hydrocarbons may have been purged from the carbon filled canister and that it may be possible to detect heater degradation via an air intake temperature sensor. An answer of no may indicate that heater degradation may not be discernable according to a temperature of an air intake hydrocarbon trap.

At 540, method 500 closes the canister purge valve and deactivates the emissions system pump (e.g., 206 of FIG. 2). Method 500 proceeds to exit.

At 514, method 500 closes the canister purge valve and deactivates the emissions system pump (e.g., 206 of FIG. 2). Method 500 proceeds to 516.

At 516, method 500 activates the carbon filled canister's heater. The heater may be supplied with electrical power via the controller. Method 500 may wait a predetermined amount of time before proceeding to 518.

At 518, method 500 activates the evaporative emissions system pump. The pump is activated so that pressure may build within the carbon filled canister before vapors are released from the carbon filled canister. The pump may supply air to the carbon filled canister to purge fuel vapors from the carbon filled canister. Method 500 proceeds to 520.

At 520, method 500 opens the canister purge valve and begins monitoring a temperature of a hydrocarbon trap that is located in the engine's air intake system. Specifically, the temperature sensor may be located in the engine's intake manifold. Method 500 may open the canister purge valve and monitor the hydrocarbon trap temperature for a predetermined amount of time. Method 500 may also close, or hold closed, a fuel tank vent valve and open the engine's throttle. Method 500 proceeds to 522.

At 522, method 500 judges if a temperature change of the hydrocarbon trap is less than a threshold. If so, the answer is yes and method 500 proceeds to 550. Otherwise, the answer is no and method 500 proceeds to 524. Method 500 may wait a threshold amount of time between step 520 and step 522. An answer of yes may indicate that the bulk of small chain hydrocarbons may have not been liberated from the carbon filled canister by the carbon filled canister heater. An answer of no may indicate that heater degradation is not present and that long chain hydrocarbons were released by the carbon filled canister and stored in the hydrocarbon trap inside the engine air intake system.

At 524, method 500 closes the canister purge valve and deactivates the emissions system pump (e.g., 206 of FIG. 2). Method 500 proceeds to exit.

At 550, method 500 closes the canister purge valve, deactivates the evaporative emissions system pump, and deactivates the carbon filled canister heater. Method 500 proceeds to 552.

At 552, method 500 indicates degradation of the carbon filled canister's heater. The indication may be provided via illuminating a light, displaying a message on a human/machine interface, or via an audible interface. Method 500 may also take mitigating actions that may include but are not limited to increasing a frequency and/or duration of purging the carbon filled canister. Method 500 proceeds to exit.

In this way, it may be possible to diagnose operation of a carbon filled canister's heater. The diagnosis may be based on a temperature of a hydrocarbon trap that is located in an engine intake system so that additional electrical connections need not be made to an evaporative emissions system. As such, the method may reduce emissions of hydrocarbons.

Figure 6:
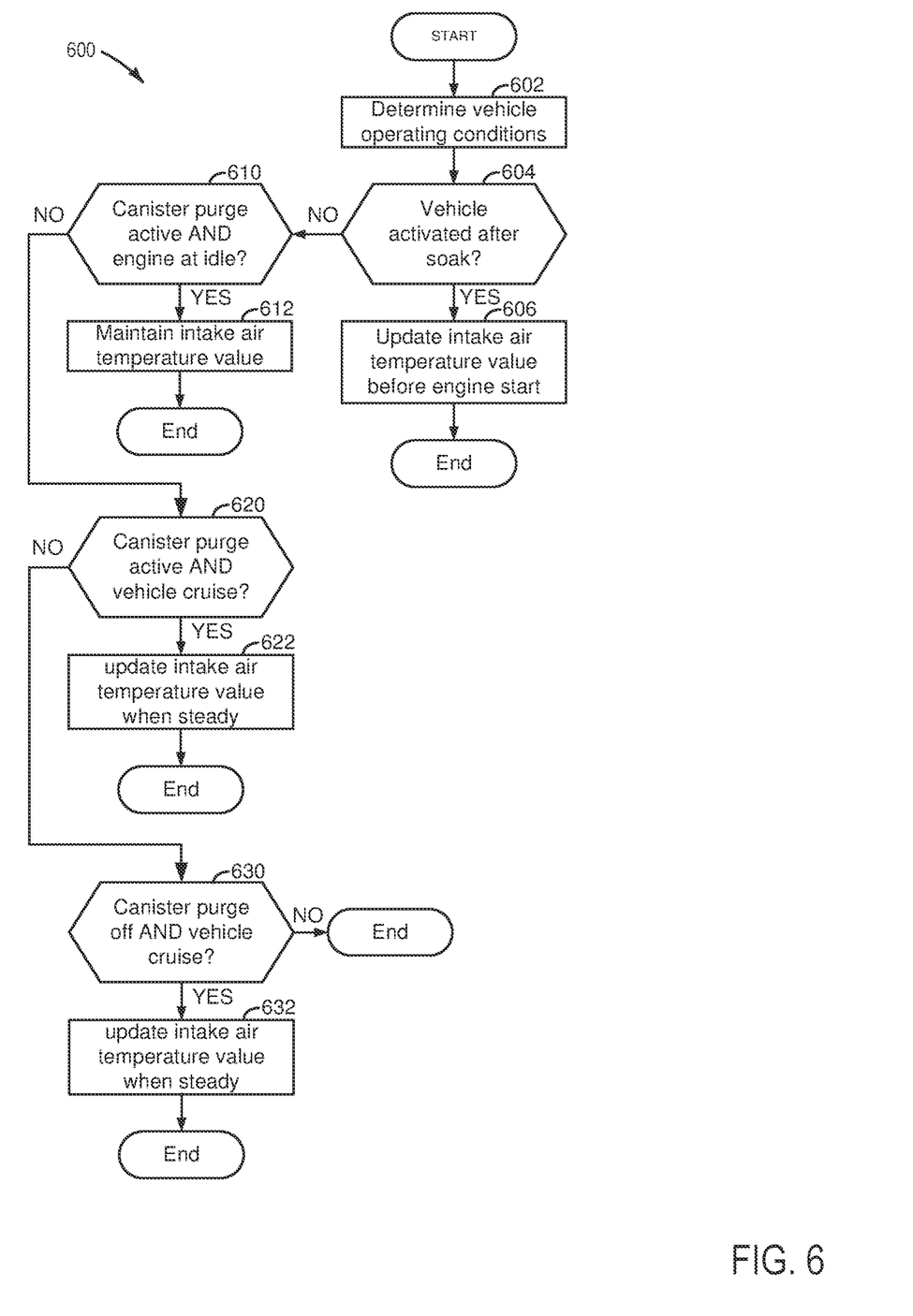
FIG. 6 shows an example method for updating an intake air temperature of a vehicle.

Referring now to FIG. 6, an example method 600 for determining an engine air intake temperature is shown. At least portions of method 600 may be included in and cooperate with a system as shown in FIGS. 1 and 2 as executable instructions stored in non-transitory memory. The method of FIG. 6 may cause the controller to actuate the actuators in the real world and receive data and signals from sensors described herein when the method is realized via executable instructions stored in controller memory.

At 602, method 600 determines vehicle operating conditions. Vehicle operating conditions may include but are not limited to ambient air temperature, engine speed, engine air flow amount, driver demand torque or power, spark timing, barometric pressure, intake inlet pressure, and engine air-fuel ratio. Method 600 may determine or infer these conditions from the various sensors mentioned herein. Method 600 proceeds to 604.

At 604, method 600 judges if the vehicle is presently being activated after a soak (e.g., period of time the vehicle was not activated). In one example, method 600 may rely on a time that is internal to the controller to determine an amount of time the vehicle was deactivated. If method 600 judges that the vehicle is presently being activated after a soak, the answer is yes and method 600 proceeds to 606. Otherwise, the answer is no and method 600 proceeds to 610.

At 606, method 600 updates the intake air temperature value before the engine started according to output of an engine air intake temperature sensor. By updating the engine air intake temperature at this time, it may be possible to reduce temperature offset that may be due to engine heat. Method 600 proceeds to exit after updating the engine intake air temperature.

At 610, method 600 judges if the carbon filled canister is presently being purged of fuel vapors and if the engine is operating at idle speed. If so, the answer is yes and method 600 proceeds to 612. Otherwise, the answer is no and method 600 proceeds to 620.

At 612, method 600 maintains the present engine air intake temperature stored in controller memory. The present value of engine air intake temperature may remain unchanged so that it is not affected by engine heat and fuel vapor adsorption into the hydrocarbon trap. Method 600 proceeds to exit.

At 620, method 600 judges if the carbon filled canister is presently being purged of fuel vapors and if the vehicle is operating at cruise conditions (e.g., partly open throttle at a slow rate of vehicle speed change). If so, the answer is yes and method 600 proceeds to 622. Otherwise, the answer is no and method 600 proceeds to 630.

At 622, method 600 updates the present engine air intake temperature stored in controller memory. The present value of engine air intake temperature may be updated when the engine air intake temperature is a steady value. Temperature increases in the engine air intake may be attributed to fuel vapor adsorption to the hydrocarbon trap from the carbon filled canister. Method 600 proceeds to exit.

630, method 600 judges if the carbon filled canister is not presently being purged of fuel vapors and if the vehicle is operating at cruise conditions. If so, the answer is yes and method 600 proceeds to 632. Otherwise, the answer is no and method 600 proceeds to exit.

At 632, method 600 updates the present engine air intake temperature stored in controller memory. The present value of engine air intake temperature may be updated when the engine air intake temperature is a steady value. Temperature decreases in the engine air intake may be attributed to fuel vapor desorption from the hydrocarbon trap. Method 600 proceeds to exit.

Thus, the method of FIG. 6 may selectively update engine air intake temperature values so that influences of purging and engine heat may be overcome. The method may also update engine air intake temperatures in a way that reduces noise on the engine air intake temperature value.

Accordingly, the methods of FIG. 6 and FIG. 7 provide for a method for operating a vehicle, comprising: activating a carbon filled canister heater, a canister purge valve, and an evaporative emissions system pump via a controller while an engine of the vehicle is off. The method includes where the carbon filled canister heater is activated in response to a request to diagnose the carbon filled canister heater. The method further comprises indicating degradation of the carbon filled canister heater in response to a temperature change being less than a threshold. The method includes where the temperature change is a temperature a change in an engine air intake system. The method includes where the temperature change in the engine air intake system is a temperature change of a hydrocarbon trap. The method further comprises increasing a frequency of purging of a carbon filled canister in response to the temperature change being less than the threshold. The method further comprises increasing a duration of purging of a carbon filled canister in response to the temperature change being less than the threshold. The method further comprises holding a fuel tank vent valve closed.

The methods of FIGS. 5 and 6 also provide for a method for operating a vehicle, comprising: activating a canister purge valve, monitoring a temperature, and activating an evaporative emissions system pump via a controller while an engine of the vehicle is off; deactivating the canister purge valve and the evaporative emissions system pump; and activating a carbon filled canister heater, a canister purge valve, and an evaporative emissions system pump while the engine is off in response to the monitored temperature not changing by more than a threshold amount. The method includes where the canister purge valve and the evaporative emissions system are activated in response to a request to diagnose the carbon filled canister heater. The method further comprises purging a carbon filled canister while the engine is running in response to the request to diagnose the carbon filled canister heater. The method further comprises indicating degradation of the carbon filled canister heater. The method further comprises performing mitigating actions in response to degradation of the carbon filled canister heater.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
an engine including an air intake system, the air intake system including an intake air temperature sensor and a hydrocarbon trap;
an evaporative emissions system coupled to the engine including a carbon filled canister, a heater in the carbon filled canister, an evaporative emissions system pump, and a canister purge valve; and
a controller including executable instructions stored in non-transitory memory that cause the controller to:
activate the canister purge valve and the pump while the engine is off, and determine if a temperature change of the hydrocarbon trap of the air intake system is less than a first threshold;
if the temperature change is less than the first threshold, activate the heater, activate the pump, and determine if a temperature change of the hydrocarbon trap of the air intake is less than a second threshold; and
indicate degradation of the heater in response the temperature change being less than the second threshold.

2. The vehicle system of claim 1, further comprising additional instructions to perform mitigating actions in response to the temperature change being less than the second threshold.

3. The vehicle system of claim 2, where the mitigating actions include increasing a frequency of purging the carbon filled canister.

4. The vehicle system of claim 2, where the mitigating actions include increasing a duration of purging the carbon filled canister.

5. The vehicle system of claim 1, further comprising additional executable instructions to deactivate the heater after a predetermined amount of time.

6. A method for operating a vehicle, comprising:
activating a canister purge valve and an evaporative emissions system pump, and determining if a temperature change of a hydrocarbon trap in an air intake is less than a first threshold; and
if the temperature change is less than the first threshold, activating a heater of a carbon filled canister, the canister purge valve, and the evaporative emissions system pump while an engine of the vehicle is off, and determining if a temperature change of the hydrocarbon trap in the air intake is less than a second threshold.

7. The method of claim 6, where the carbon filled canister heater is activated in response to a request to diagnose the carbon filled canister heater.

8. The method of claim 6, further comprising indicating degradation of the carbon filled canister heater in response to the temperature change being less than the second threshold.

9. The method of claim 8, further comprising increasing a frequency of purging of a carbon filled canister in response to the temperature change being less than the second threshold.

10. The method of claim 8, further comprising increasing a duration of purging of a carbon filled canister in response to the temperature change being less than the second threshold.

11. The method of claim 6, further comprising holding a fuel tank vent valve closed.

12. The method of claim of claim 6, wherein the first threshold is based on an amount of short chain hydrocarbons to be purged from the canister and the second threshold is based on an amount of long chain hydrocarbons to be purged from the canister.

13. The method of claim of claim 12, wherein if the temperature change is less than the first threshold, then the short chain hydrocarbons have been purged from the canister, and
if the temperature change is greater than the first threshold, heater functionality cannot be determined and the method proceeds to terminate.

14. The method of claim of claim 13, wherein if the temperature change of the hydrocarbon trap is greater than the second threshold, heater functionality cannot be determined and the method proceeds to terminate.

15. The method of claim of claim 6, wherein when determining if the temperature change of the hydrocarbon trap is less than the first threshold, the canister heater is off and the engine is off when the pump is on.

16. A method for operating a vehicle, comprising:
activating a canister purge valve, monitoring a temperature of a hydrocarbon trap in an air intake, and activating an evaporative emissions system pump via a controller while an engine of the vehicle is off;
deactivating the canister purge valve and the evaporative emissions system pump; and
if a temperature change of the hydrocarbon trap of the air intake is less than a first threshold, activating a carbon filled canister heater, a canister purge valve, and an evaporative emissions system pump while the engine is off, and determining if a temperature change of the hydrocarbon trap of the air intake is less than a second threshold.

17. The method of claim 16, where the canister purge valve and the evaporative emissions system are activated in response to a request to diagnose the carbon filled canister heater.

18. The method of claim 17, further comprising purging a carbon filled canister while the engine is running in response to the request to diagnose the carbon filled canister heater.

19. The method of claim 18, further comprising indicating degradation of the carbon filled canister heater.

20. The method of claim 19, further comprising performing mitigating actions in response to degradation of the carbon filled canister heater.

* * * * *